Feb. 13, 1962 R. B. McFARLAND 3,021,507
SELECTORS FOR AUTOMATIC PHONOGRAPHS
Filed Aug. 20, 1956 5 Sheets-Sheet 1
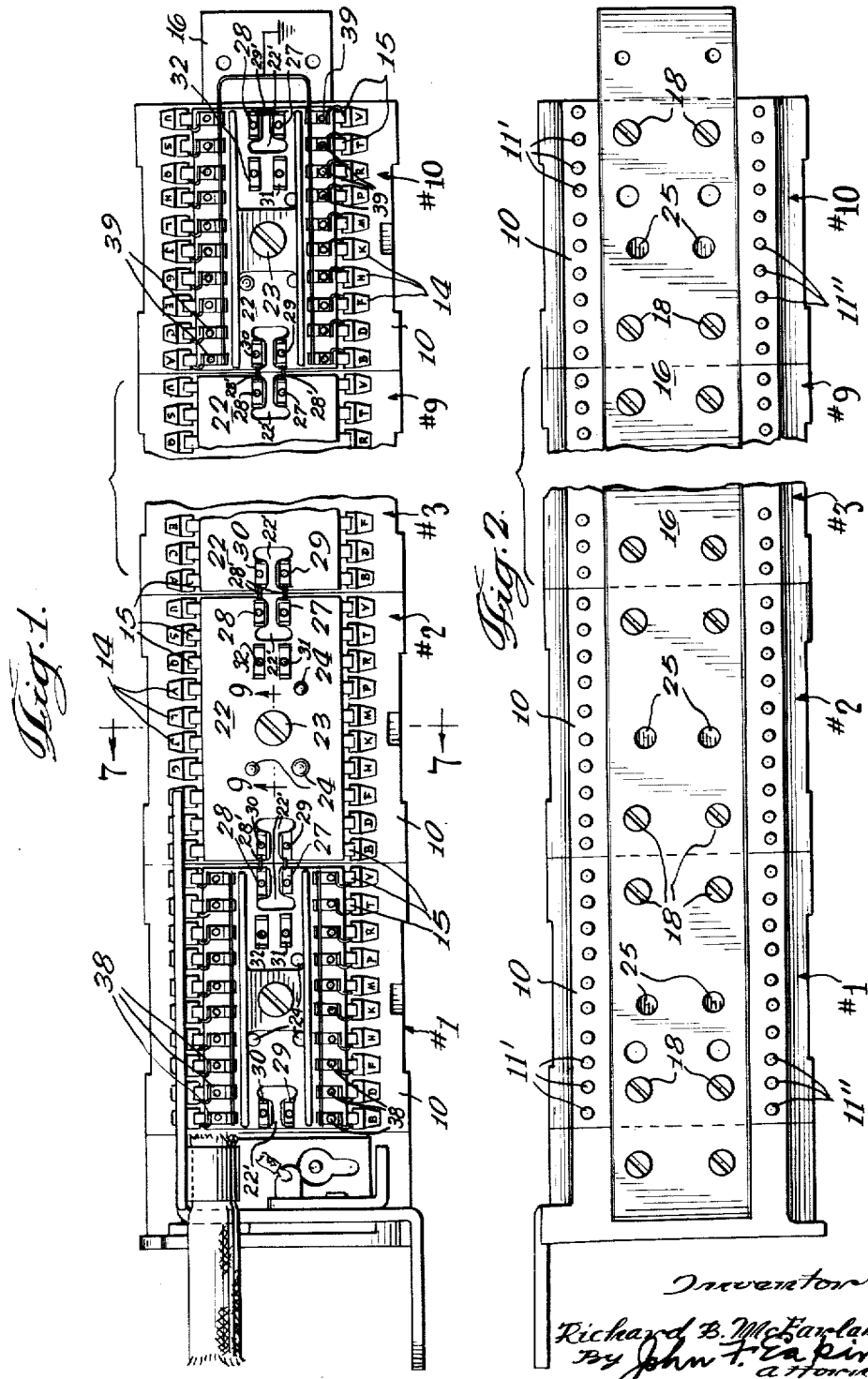

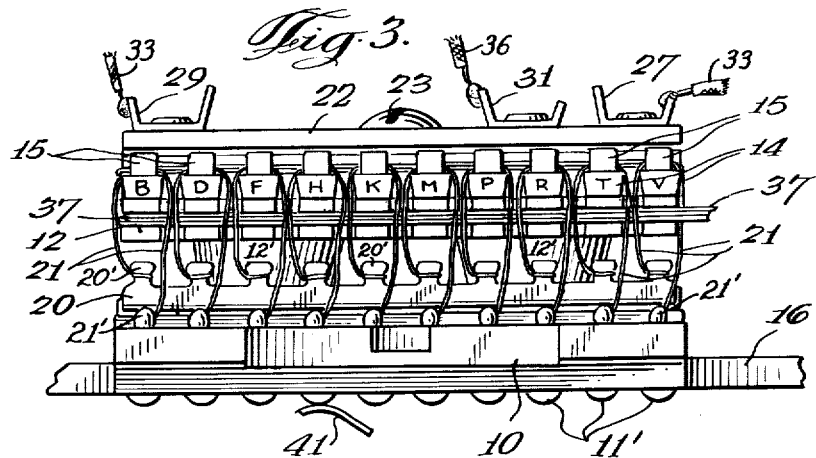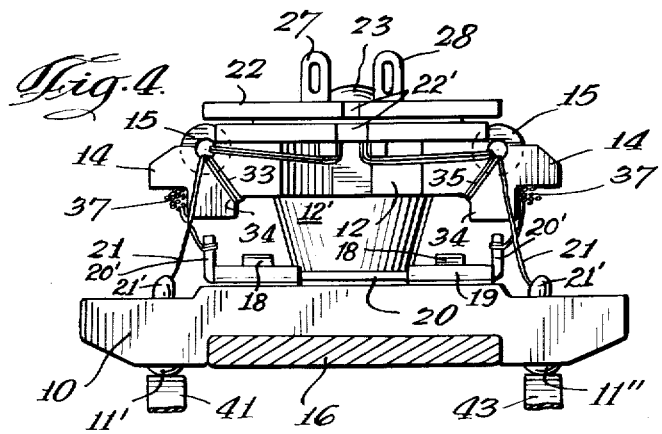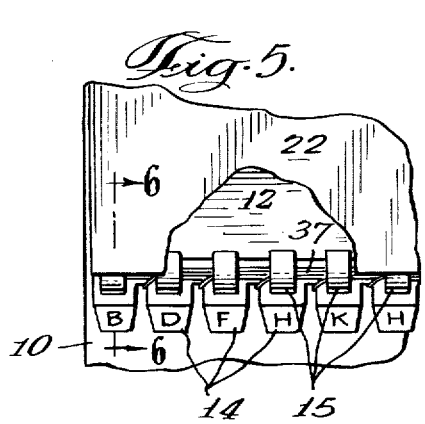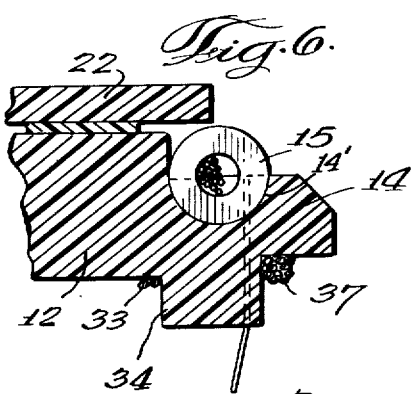

Feb. 13, 1962 R. B. McFARLAND 3,021,507
SELECTORS FOR AUTOMATIC PHONOGRAPHS
Filed Aug. 20, 1956 5 Sheets-Sheet 3
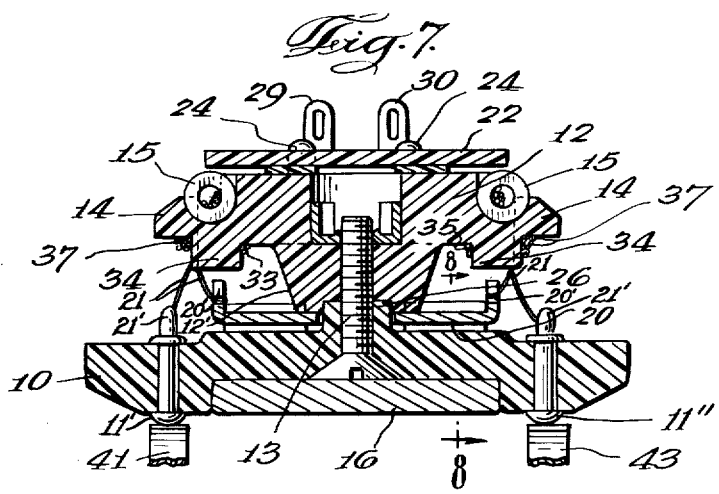
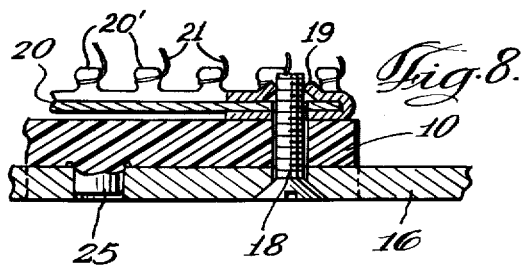
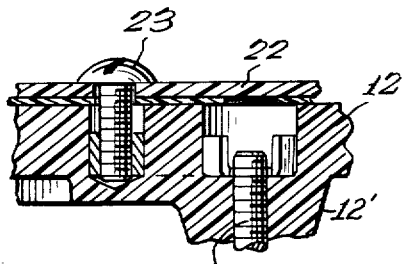
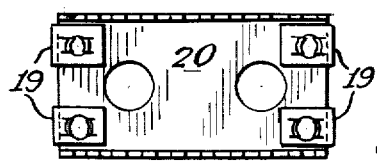
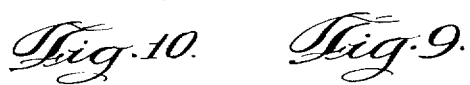
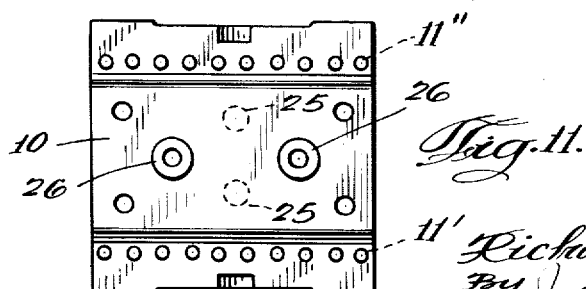
Inventor
Richard B. McFarland
By John F. Eakins
attorney Inventor
Richard B. McFarland
By John F. Eakins
attorney

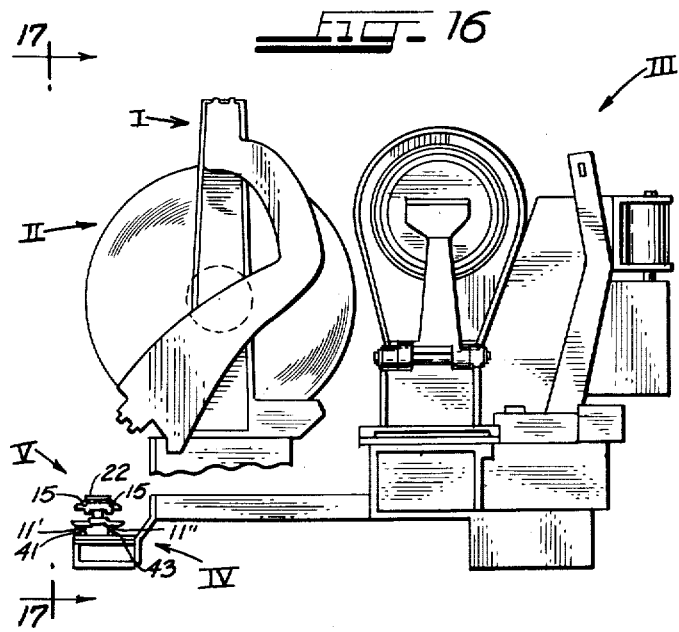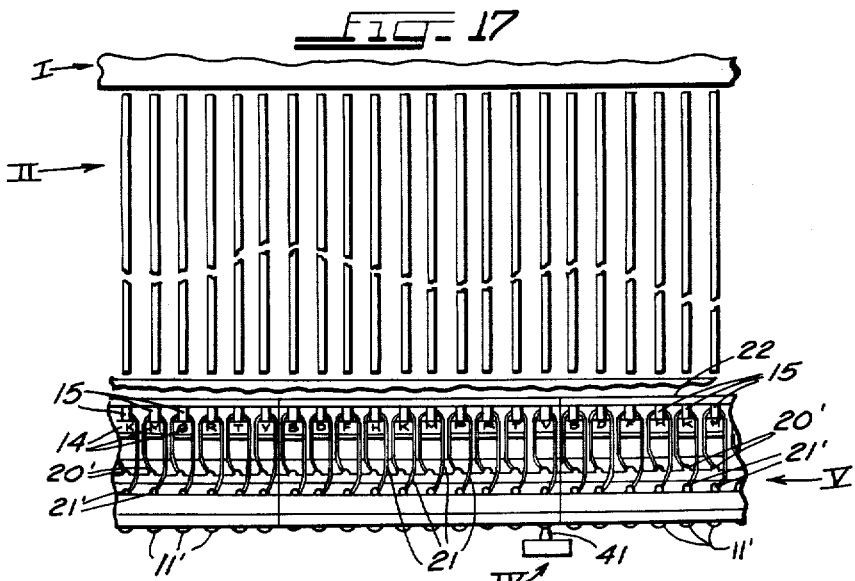

United States Patent Office 3,021,507
Patented Feb. 13, 1962

3,021,507
SELECTORS FOR AUTOMATIC PHONOGRAPHS
Richard B. McFarland, Glenview, Ill., assignor, by mesne assignments, to The Seeburg Corporation, a corporation of Pennsylvania
Filed Aug. 20, 1956, Ser. No. 605,077
8 Claims. (Cl. 340—162)

This invention relates to selectors, and particularly to selectors for automatic phonographs of the general type described and claimed in the co-pending application, Serial Number 452,876, filed August 30, 1954, by Clarence W. Schultz and George F. Boesen, now U.S. Patent No. 2,923,553.

That selector included a matrix of magnetizable toroids through which were passed a plurality of conductors, each toroid corresponding to one available recording. The recordings were identified as A1, A2 . . . A10, B1, B2 . . . B10, C1, C2 . . . C10 . . . K1, K2 . . . K10. A write-in conductor was passed through all the A toroids, that is through A1, A2 . . . A10. Another write-in conductor was passed through the B toroids and so forth. Other write-in conductors were passed through the numbers toroids. That is, a write-in conductor No. 1 was passed through the A1, B1, C1 . . . toroids. A No. 2 write-in conductor was passed through the A2, B2, C2 . . . toroids, and so forth. When a certain recording was selected, C7 for example, two simultaneous pulses of the same electrical direction were passed through all the C toroids and all the 7 toroids respectively. The C7 toroid alone received both pulses and was thereby reversely magnetized; all the other C and 7 toroids were unaffected.

An individual conductor was passed through each toroid which applied a reverse or demagnetizing pulse to each toroid seriatim as the playing unit of the phonograph traveled along its path. An output conductor was passed through all the toroids. When the reverse pulse was passed through a selected or reversely magnetized toroid, it became reversely magnetized and an impulse was generated in the output conductor which was utilized to arrest the playing carriage and initiate the playing of the corresponding recording.

The fabrication of the matrix and particularly the threading of four separate conductors through each toroid was difficult and tedious, and the principal object of this invention is to provide an improved toroid assembly which is simple and expeditious to assemble.

According to the present invention I make the toroid assembly in a plurality of units in each of which the toroids are arranged in aligned rows in relatively close spacing so that at least two of the conductors can be threaded through a row of toroids at one pass. In my preferred embodiment described hereinafter, I mount the toroids in two such rows with the toroids in any one row having the same spacing as that of the records in the phonograph record magazine. I also provide a series of contacts which are mounted on the same frame as said toroids, and in the embodiment to be described herein it will be seen that said contacts are also mounted in two aligned rows which correspond to said rows of toroids, with the contacts in any one row spaced the same as that of the records in the magazine. Said contacts are so arranged for cooperation with the phonograph's movable selector member as will be more fully described hereinafter.

The toroid assembly described and illustrated herein is intended to control 200 recordings corresponding to records A1 to A10, B1 to B10, . . . V1 to V10. (It is to be noted that the letters I and O are not used to avoid confusion with the numbers 1 and 0.) In this embodiment I prefer to provide 10 toroid units corresponding to the numbers 1 to 10, and to provide each unit with two rows of toroids, each row with 10 toroids. One row of toroids corresponds to recordings B, D, F . . . T, V, and the other rows of toroids corresponds to the recordings A, C, E . . . S, U, all of said recordings being further identified by the number of the corresponding unit. These two rows of toroids are located on opposite sides of the unit and are arranged so that a toroid in one row, for example K4, is opposite the toroid J4 in the other row, and these toroids correspond to opposite sides of the same record.

Each unit comprises a numbers write-in conductor which extends through both rows of toroids (so as to be common to all toroids having the same number) and is connected to terminals whereby the corresponding numbers pulse may be applied to all the toroids of that unit. Each row of toroids may be provided with an individual output conductor. It is preferred to thread the output conductor three passes through its row of toroids, a procedure which is greatly facilitated by the fact that the toroids of each row are in alignment and in close spaced relation. The ten units are mounted in end to end relation and the terminals of the output conductors of the various units are connected in series while the terminals on the last unit are connected together to provide a single output circuit.

The toroids of each row have the same spacing as the spacing of the records in the magazine and each unit comprises two series of contacts with the same spacing. A separate conductor is connected to each contact and is passed through the corresponding toroid. As in the embodiment of the above-identified application, the phonograph's movable playing unit or selector member is provided with two brushes, each arranged to cooperate with one row of contacts to supply a reversely magnetizing impulse to the toroids seriatim. As in said embodiment one row of contacts is grounded when the selector member is moving in one direction, and the other row is grounded when the carriage is moving in the opposite direction.

After the units are assembled end to end, the letters conductors (which are common to all toroids having the same letter) are installed. Thus a conductor extending along the assembly is installed and is threaded through the toroids A1, A2, A3, etc. Another letters conductor is threaded through the toroids B1, B2, B3, etc., and so forth, making a total of twenty letters conductors.

It will be readily understood that when similar pulses are supplied to a letters conductor, for example C, and to the numbers conductor of one unit, for Example 7, then toroid C7 alone receives the double impulse necessary to reversely magnetize it and thereby store a signal for the playing of the recording C7. When the carriage or selector member is moving in the proper direction for the playing of the record C7, its energized brush engages the contact C7 when said carriage reaches the corresponding playing position, passing a pulse through the toroid C7 which reverses its magnetization back to normal. The change of field creates a pulse in the output circuit, which is utilized to arrest the playing carriage in position to reproduce the recording C7, in the manner described in the above-identified application.

The invention will readily be understood from the following description of a preferred embodiment thereof taken in conjunction with the accompanying drawings, in which:

FIGURE 1 is a plan view of the assembly, partly broken away;

FIG. 2 is an inverted plan view;

FIG. 3 is a side elevation of one unit;

FIG. 4 is an end elevation thereof;

FIG. 5 is a fragmentary plan with the upper cover removed, to show the toroids;

FIG. 6 is a fragmentary section taken on the line 6—6 of FIG. 5, showing the manner in which the toroids are seated;

FIG. 7 is a cross-section of the assembly taken on the line 7—7 of FIG. 1;

FIG. 8 is a fragmentary section taken on the line 8—8 of FIG. 7;

FIG. 9 is a fragmentary section taken on the line 9—9 of FIG. 1;

FIG. 10 is a plan view of the grounded strip of a unit;

FIG. 11 is a plan view of the base element of a unit;

FIG. 16 is a partially schematic end elevational view of a phonograph embodying one of my toroid assemblies; and FIG. 17 is a front elevational view of said phonograph illustrating in particular the spacing of the toroids and corresponding contacts in relation to the spacing of records in the phonograph's record magazine.

Figure 12:
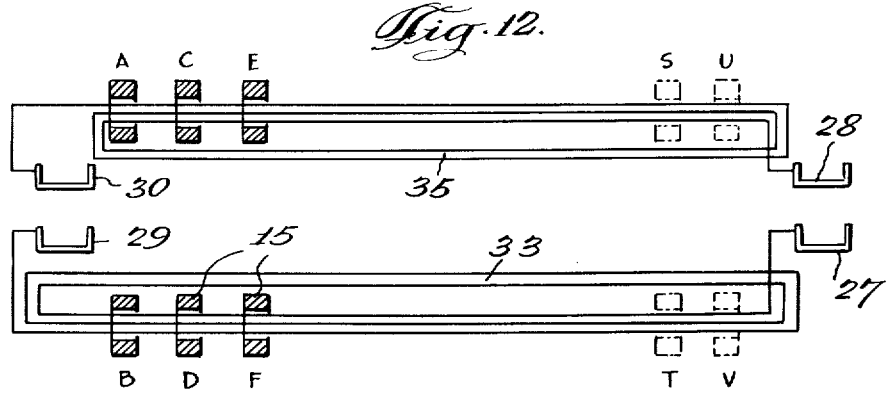
FIG. 12 is a diagrammatic view showing the manner in which the output windings are applied to the toroids of a unit.
Figure 13:
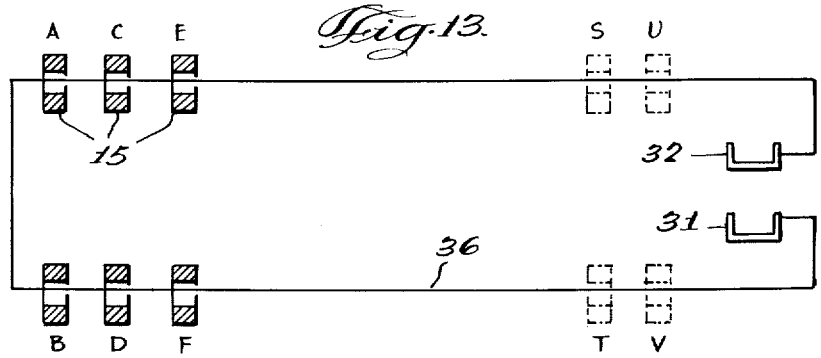
FIG. 13 is a similar view showing the manner in which a unit or numbered write-in winding is applied to the toroids of a unit.

Referring to the drawings, the embodiment of the invention illustrated is intended for two hundred selections, identified as A1 to A10, B1 to B10 . . . V1 to V10. (The letters "I" and "O" are not used to avoid confusion with the numbers "1" and "0.")

The complete toroid assembly is assembled from ten units. The first unit corresponds to A1, B1 . . . V1. The second unit corresponds to selections A2, B2, . . . V2, and so forth.

Figure 15:
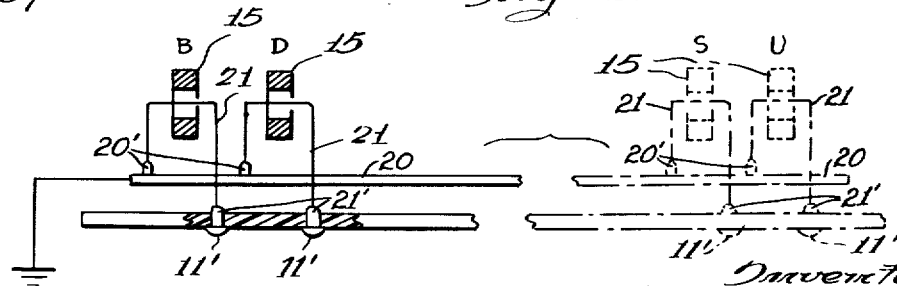
FIG. 15 is a similar view showing the manner in which an individual winding is associated with each toroid.

Each unit comprises a base 10 of insulating material in which are embedded two series of contacts 11' and 11" (FIGS. 2, 11 and 15), one on each side. These contacts have the same spacing as the records in the magazine, the contacts 11' corresponding to one side of the records, and the contacts 11" corresponding to the other side of the records. Thus, the first contact 11' may correspond to the selection B3 and the opposite contact 11" may correspond to the selection A3, these two selections being on opposite sides of the same record.

A body portion 12 (FIGS. 3-7 and 9), also of insulating material, is mounted on the base 10 by means of bosses 12' (FIGS. 3, 4, 7 and 9) on its under side, which are secured to the base 10 by screws 13 (FIGS. 7 and 9), thus maintaining the body portion 12 in spaced relation to the base 10.

Along each edge the body portion 12 is provided with lugs 14 (FIGS. 1 and 3-7), one corresponding to each contact 11' and 11". Each lug 14 and the adjacent portion of the body portion 12 are provided with a recessed seat 14' (see FIG. 6) for a toroid 15 (FIGS. 1, 3-7 and 12-15), leaving the openings of the toroids clear for the insertion of conductors. It will be understood that ten aligned toroids are mounted on each side of the body portion 12 for each unit #1-#10.

When finally assembled, the units are secured end to end on a grounded metal strip 16 (FIGS. 1, 2-4, 7 and 8) by screws 18 (FIGS. 2 and 8), which are threaded into lugs 19 (FIGS. 4, 8 and 10) on a grounded plate 20 (FIGS. 3, 4, 7, 8, 10 and 15). The plate 20 is clamped to the upper side of the base 10, by the bosses 12' of the body portion 12. It is to be noted that the plate 20 is grounded by the screws 18.

Along each side the grounded plate 20 is provided with ten soldering lugs 20' (FIGS. 3, 4, 7, 8 and 15) to which conductors 21 are connected. Each conductor 21 is threaded through the corresponding toroid and its outer end secured to a soldering lug 21' (FIGS. 3, 4, 7 and 15) on the corresponding contact 11' or 11".

Each unit is provided with a strip of insulating material 22 (FIGS. 1, 3-7 and 9) which is secured to the body portion 12 by a scerw 23 (FIGS. 1, 3, 4 and 9). The body portion is provided with projections 24 (FIGS. 1 and 7) which extend into corresponding openings in the strip 22 to insure correct placement. It may also be noted that the base 10 is provided with projections 25 (FIGS. 2 and 11) which extend into corresponding openings in the metal strip 16, also to insure correct position. It may further be noted that the base 10 is provided with upwardly projecting bosses 26 (see FIG. 7) which extend into openings in the depending bosses 12' of the body portion 12, the screws 13 extending through openings in the bosses 26.

It may here be noted that the individual conductors 21 correspond to the lines 34 of the above-identified application.

Upon each strip 22 are mounted six soldering lugs 27, 28, 29, 30, 31 and 32 (FIGS. 1, 3, 4, 7, 12 and 13). These lugs are located near the ends of the strip 22 and corresponding terminal slots 22' (FIGS. 1 and 4) are provided in the strip 22 and in the body portion 12 to permit conductors connected to these lugs to be brought down to the level of the toroids 15 to be passed therethrough. The lug 29 has secured thereto a conductor 33 (FIGS. 4, 6, 7 and 12) which is threaded through the ten forward toroids, returned behind a shoulder 34 (FIGS. 4, 6 and 7) on the body portion 12, passed again through the ten forward toroids, again returned behind the shoulder 34 and again extended through the ten forward toroids, its end being secured to the lug 27. A similar conductor 35 (FIGS. 4, 7 and 12) is connected to the lug 30 and to the lug 28, also having three lengths extending through the rear toroids. The lugs 29 and 30, respectively, are connected to lugs 27 and 28 of the preceding unit by connecting leads 28' (see FIG. 1). The lugs 27 and 28 of the final unit are connected together by a connecting lead 29' (see FIG. 1) so that the conductors 33 and 35 constitute a single output circuit corresponding to the conductor 38 of the above-identified application. The passage of this circuit three times through each toroid increases the signal picked up by this output circuit when a selecting toroid 15 becomes reversely magnetized.

A conductor 36 (FIG. 13) is provided for each unit and is connected to the lug 31, passed through the front series of toroids, extended along the end of the body portion 12, passed through the rear series of toroids and is secured to the lug 32. The conductor 36 is a write-in circuit which corresponds to one of the conductors 41 of the above-identified application.

It may here be remarked that when a selection such as A3, B3, C3, etc. is made, an impulse passes through the conductor 36 of the third unit. Independent conductors (not shown) are connected to each lug 32 and the lugs 31 are connected to a common ground (not shown) so as to provide a complete circuit for such impulses.

In assembling a unit, the conductors 21 are connected to the soldering lugs 20' of the grounded plate 20. The body portion 12 is secured to the base 10 clamping the plate 20 in its position. The toroids 15 are placed in their respective seats and the strip 22 is secured in position. Each conductor 21 is passed through its corresponding toroid 15 and connected to the soldering lug 21' of the corresponding contact 11' or 11" as the case may be. The conductors 33, 35 and 36 are installed in the manner previously described. It will readily be understood that the installation of these conductors is greatly facilitated by the fact that the toroids are arranged in alignment in two sets of ten on each unit.

After the units are assembled on the strip 16, the "letters" conductors 37 (FIGS. 3, 4, 6, 7 and 14) are installed. For this purpose the strip 22 of the first unit is provided with two sets of ten soldering lugs 38 (see FIG. 1), to which said conductors 37 are connected, corresponding to the letters A, B, C . . . T, U, V. The first front lug 38 corresponds to the letter B. Consequently, a conductor 37 is connected to it and passed through the first front toroid of the first unit. This conductor 37 is passed along the front of the body portion 12 below the lugs 14, and is passed through the first front toroid of the second unit, the first front toroid of the third unit and so forth (shown best in FIG. 14). Its extremity is soldered to a lug 39 (see FIG. 1) on the strip 22 of the last or tenth unit. It will readily be understood that when a selection including the letter "B" is made, a pulse is passed through all the toroids "B."

Figure 14:
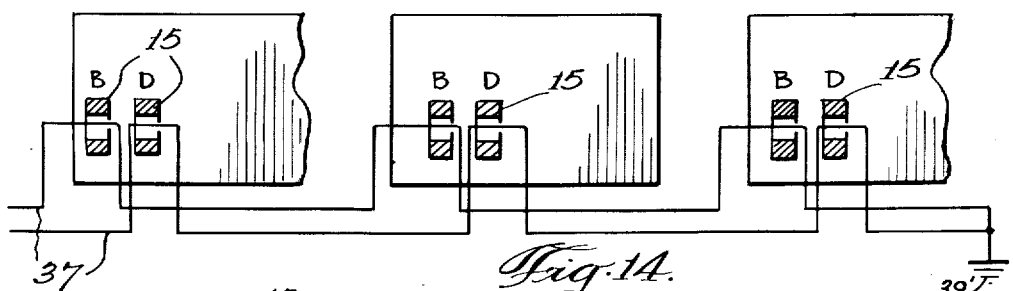
FIG. 14 is a similar view showing the manner in which the lettered write-in windings are applied to one similarly located toroid on each of a plurality of units.

Still referring to FIGS. 1 and 14, a second conductor 37 is connected to the next front lug 38 and is similarly passed through the next toroid of each unit, that is the D toroids. The next front lug 38 is connected to a third conductor 37 which is passed through all the third front toroids of the tens units, these being the F toroids. Installation is continued until each of the toroids has a letters conductor 37 passing through it. All the lugs 39 are connected to a ground 39' (see FIG. 14).

All the toroids are normally magnetized in a certain sense. When voltage is applied to one of the conductors 37, for example, the B conductor, a field is established in each B toroid tending to reverse its magnetization. For the reason set forth in the above-identified application, this pulse alone is unable to reverse the magnetization of any B toroid. When a selection is made, for example B3, the conductor 36 of the third unit also receives a pulse creating a field tending to reverse the magnetization of all the toroids in the third unit. This pulse is by itself unable to effect reversal of the magnetization of these toroids. However, it will be noted that at this time the toroid B3 is subjected to the combined action of the two pulses so that its state of magnetization is reversed. Similarly, if a selection C4 is made, only the corresponding toroid C4 becomes reversely magnetized.

As described in the above-identified application, any desired selections can be made, each corresponding to a letter and a number. A phonograph of the general type described in said application (except for the toroid assembly) is shown somewhat schematically in FIG. 16 and comprises a stationary record magazine I for accommodating a plurality of records II, a movable carriage III (also referred to as a playing unit or movable selector member) which travels along said magazine to assume a plurality of playing positions corresponding respectively to said records, and a member indicated generally at IV which is affixed to said carriage for movement therewith and which carries the brushes 41 and 43. One of my toroid assemblies (shown best in FIGS. 4 and 7) is indicated at V and it will be noted that the rows of contacts 11' and 11" are spaced the same as the brushes 41 and 43 for cooperation therewith. Also, as previously stated, both the toroids 15 and the contacts 11' and 11" in any one respective row thereof have the same spacing as that of the records in the magazine (see FIG. 17).

In each case the corresponding toroid is reversely magnetized by the double pulse passing through its numbers winding 36 and its letter winding 37. The phonograph motor (not shown) goes into operation and as the carriage travels it moves the energized brushes 41 and 43 (see FIG. 4) (only one of said brushes is energized at a given time depending upon the direction of travel of the carriage) past the rows of contacts 11' and 11" (one of said rows of contacts being grounded depending upon the direction of said movement) causing a pulse to pass through one row of the toroids seriatim. This pulse tends to reverse each toroid back to its normal state of magnetization, and in the case of the toroids which have not been reversely magnetized by a selecting operation, this pulse has no effect. When, however, such a pulse is passed through the conductor 21 of a selecting toroid, its magnetization is reversed and the resulting change of flux creates a pulse in the output circuit (33 and 35) which is utilized to arrest the carriage at the position determined by the effective toroid, resulting in the playing of the corresponding recording.

The magnetic material employed in the toroids may suitably be any of the modern magnetic materials generally referred to as ferrites which have a substantially rectangular hysteresis characteristic. We have, for example, used ferrites composed of iron oxide, manganese oxide and magnesium oxide which have such a characteristic. The normal state of magnetization of any one of the toroids is such that if a field of the magnitude resulting from the first pulse above-mentioned is created momentarily the magnetization of the toroid is unaffected. However, if a field of the magnitude resulting from the second pulse above-mentioned is created, the toroid will be magnetized in the opposite sense, resulting in the selection and playing of the corresponding record as above-described.

Although the invention has been described in relation to a specific embodiment thereof, it must be understood the invention is not intended to be limited to the details of such embodiment, except in so far as set forth in the accompanying claims.

Having thus described my invention, I declare that what I claim is:

1. For use in automatic phonographs having a record magazine and a movable selector member with a pair of electrically energizable brushes or the like mounted thereon, a toroid assembly including: a mounting frame; a plurality of contacts, one for each recording in the magazine, mounted on said frame and arranged in two rows which extend approximately from one end of said magazine to the other and are parallel thereto, the contacts in each row having the same spacing as that of the records in the magazine and said rows being spaced apart the same as said brushes for cooperation therewith; and a plurality of record-selecting toroids mounted on said frame, one for each recording in the magazine and each made of a material having a substantially rectangular hysteresis loop characteristic, said toroids being mounted in two rows each of which is substantially parallel to and in proximity to a corresponding one of said two rows of contacts, the toroids in each row also having approximately the same spacing as the records in the magazine.

2. For use in automatic phonographs having a record magazine and a movable selector member with a pair of electrically energizable brushes or the like mounted thereon, a toroid assembly including: a mounting frame; a plurality of contacts, one for each recording in the magazine, mounted on said frame and arranged in two rows which extend approximately from one end of said magazine to the other and are parallel thereto, the contacts in each row having the same spacing as that of the records in the magazine and said rows being spaced apart the same as said brushes for cooperation therewith; a plurality of record-selecting toroids mounted on said frame, one for each recording in the magazine and each made of a material having a substantially rectangular hysteresis loop characteristic, said toroids being mounted in two rows each of which is substantially parallel to and in proximity to a corresponding one of said two rows of contacts, the toroids in each row having approximately the same spacing as said contacts so that for each contact a corresponding toroid will be positioned adjacent thereto; a grounded member; and a plurality of individual windings each passing through a corresponding toroid and having one end connected to the contact adjacent to said toroid and the other end connected to said grounded member.

3. For use in automatic phonographs having a record magazine and a movable selector member with a pair of electrically energizable brushes or the like mounted thereon, a toroid assembly consisting of a plurality of units mounted end-to-end in aligned juxtaposition, each unit including: a mounting frame; a plurality of contacts, said assembly having one contact for each recording in the magazine, mounted on said frame in such a manner that when said units are assembled there are formed two rows of contacts which extend approximately from one end of said magazine to the other and are parallel thereto, the contacts in each row having the same spacing as that of the records in the magazine and said two rows being spaced apart the same as said brushes for cooperation therewith; a plurality of record-selecting toroids mounted on said frame, one for each contact and each made of a material having a substantially rectangular hysteresis loop characteristic, said toroids being mounted in two rows each of which is substantially parallel to and in proximity to a corresponding one of said two rows of contacts, the toroids in each row having approximately the same spacing as said contacts with the openings of all the toroids in any one row in substantial alignment with each other; a unit write-in winding on each unit extending through all of the toroids on said unit; and a plurality of additional write-in windings each passing through one similarly located toroid on each unit.

4. For use in automatic phonographs having a record magazine and a movable selector member with a pair of electrically energizable brushes or the like mounted thereon, a toroid assembly consisting of a plurality of units mounted end-to-end in aligned juxtaposition, each unit including: a mounting frame; a plurality of contacts, said assembly having one contact for each recording in the magazine, mounted on said frame in such a manner that when said units are assembled there are formed two rows of contacts which extend approximately from one end of said magazine to the other and are parallel thereto, the contacts in each row having the same spacing as that of the records in the magazine and said two rows being spaced apart the same as said brushes for cooperation therewith; a plurality of record-selecting toroids mounted on said frame, one for each contact and each made of a material having a substantially rectangular hysteresis loop characteristic, said toroids being mounted in two rows each of which is substantially parallel to and in proximity to a corresponding one of said two rows of contacts, the toroids in each row having approximately the same spacing as said contacts with the openings of all the toroids in any one row in substantial alignment with each other; a unit write-in winding on each unit extending through all the toroids on said unit; a plurality of additional write-in windings each passing through one similarly located toroid on each unit; a common pick-up winding extending through a plurality of aligned toroids; and a plurality of individual windings each passing through a corresponding toroid and having one end connected to a corresponding contact.

5. For use in automatic phonographs having a record magazine and a movable selector member, a toroid assembly consisting of a plurality of units mounted end-to-end in aligned juxtaposition, each unit including: a mounting frame; a plurality of record-selecting toroids, said assembly having one toroid for each recording in the magazine and each being made of a material having a substantially rectangular hysteresis loop characteristic, mounted on said frame in such a manner that when said units are assembled there are formed two rows of toroids which extend approximately from one end of said magazine to the other and are parallel thereto, the toroids in each row having approximately the same spacing as that of the records in the magazine; a unit write-in winding on each unit extending through all the toroids on said unit; a plurality of additional write-in windings each passing through one similarly located toroid on each unit; and a plurality of contacts mounted on said frame in proximity to corresponding toroids and arranged for cooperation with said movable selector member.

6. A toroid assembly of the type set forth in claim 1 wherein said mounting frame is provided with a plurality of recessed seats, one for accommodating each of said toroids with the openings in said toroids unobstructed.

7. A toroid assembly of the type set forth in claim 6 wherein a plate member is affixed to said frame to maintain the toroids within their respective recessed seats.

8. A toroid assembly of the type set forth in claim 3 wherein said mounting frame is provided with a plurality of lugs, one adjacent to each of said toroids, whereby said additional write-in windings may each be passed through one similarly located toroid of each unit and passed beneath those lugs which are disposed between such similarly located toroids.

References Cited in the file of this patent
UNITED STATES PATENTS

| | | |
|---|---|---|
| 2,621,241 | Jensen | Dec. 9, 1952 |
| 2,712,126 | Rosenberg et al. | June 28, 1955 |
| 2,778,977 | Lubkin | Jan. 22, 1957 |
| 2,783,416 | Butler | Feb. 26, 1957 |
| 2,784,391 | Rajchman et al. | Mar. 5, 1957 |
| 2,823,360 | Jones | Feb. 11, 1958 |
| 2,823,372 | Jones | Feb. 11, 1958 |
| 2,823,373 | Consalvi | Feb. 11, 1958 |
| 2,923,553 | Schultz | Feb. 2, 1960 |